(12) United States Patent
Choi et al.

(10) Patent No.: US 9,635,679 B2
(45) Date of Patent: Apr. 25, 2017

(54) TERMINAL SIGNAL TRANSMISSION TIMING RANDOMISATION METHOD AND DEVICE IN WIRELESS COMMUNICATION SYSTEM

(71) Applicant: Samsung Electronics Co., Ltd., Gyeonggi-do (KR)

(72) Inventors: Seung Hoon Choi, Gyeonggi-do (KR); Ki Il Kim, Gyeonggi-do (KR); Sang Min Ro, Seoul (KR); Hyo Jin Lee, Seoul (KR); Ju Ho Lee, Gyeonggi-do (KR); Joon Young Cho, Gyeoggi-do (KR); Hyoung Ju Ji, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 260 days.

(21) Appl. No.: 14/372,206

(22) PCT Filed: Jan. 11, 2013

(86) PCT No.: PCT/KR2013/000265
§ 371 (c)(1),
(2) Date: Jul. 14, 2014

(87) PCT Pub. No.: WO2013/105828
PCT Pub. Date: Jul. 18, 2013

(65) Prior Publication Data
US 2014/0348144 A1    Nov. 27, 2014

(30) Foreign Application Priority Data
Jan. 13, 2012  (KR) .................. 10-2012-0004397

(51) Int. Cl.
*H04W 72/12*   (2009.01)
*H04W 56/00*   (2009.01)
(Continued)

(52) U.S. Cl.
CPC .......... *H04W 72/12* (2013.01); *H04L 5/0057* (2013.01); *H04L 5/0062* (2013.01);
(Continued)

(58) Field of Classification Search
None
See application file for complete search history.

(56) References Cited

U.S. PATENT DOCUMENTS

2003/0105964 A1* 6/2003 Brainard ................ G06Q 20/32
                                                        713/178
2003/0203735 A1* 10/2003 Andrus ................. H04W 36/30
                                                        455/450
(Continued)

FOREIGN PATENT DOCUMENTS

KR    10-2009-0076784    7/2009
KR    10-2010-0075378    7/2010
(Continued)

OTHER PUBLICATIONS

International Search Report dated Apr. 29, 2013 in connection with International Patent Application No. PCT/KR2013/000265, 5 pages.
(Continued)

*Primary Examiner* — Chi H Pham
*Assistant Examiner* — Ronald H Davis

(57) ABSTRACT

The present disclosure relates to a terminal signal transmission timing randomisation method and device in a wireless communication system, and the terminal signal transmission method in a wireless communication system of the present disclosure comprises the steps of: receiving, from a base station, setting information for randomising transmission timing with respect to a signal transmitted by a terminal; determining the transmission timing for the signal in accor-
(Continued)

dance with the setting information; and transmitting the signal to the base station in accordance with the determined transmission timing.

20 Claims, 16 Drawing Sheets

(51) Int. Cl.
*H04L 5/00* (2006.01)
*H04L 27/26* (2006.01)
*H04B 7/0417* (2017.01)

(52) U.S. Cl.
CPC ... *H04W 56/0015* (2013.01); *H04W 56/0045* (2013.01); *H04B 7/0417* (2013.01); *H04L 27/2613* (2013.01)

(56) References Cited

U.S. PATENT DOCUMENTS

| | | | | |
|---|---|---|---|---|
| 2006/0120470 A1* | 6/2006 | Hwang | ............ | H04W 99/00 375/260 |
| 2007/0076682 A1* | 4/2007 | Kim | ............ | H04W 74/085 370/349 |
| 2008/0095185 A1* | 4/2008 | DiGirolamo | .......... | H04L 1/0026 370/464 |
| 2009/0163199 A1* | 6/2009 | Kazmi | ................ | H04L 1/0026 455/425 |
| 2009/0268674 A1* | 10/2009 | Liu | ...................... | H04W 72/02 370/329 |

FOREIGN PATENT DOCUMENTS

| | | |
|---|---|---|
| KR | 10-2011-0026399 | 3/2011 |
| KR | 10-2011-0093166 | 8/2011 |
| KR | 10-2011-0133448 | 12/2011 |

OTHER PUBLICATIONS

Written Opinion of International Searching Authority dated Apr. 29, 2013 in connection with International Patent Application No. PCT/KR2013/000265, 5 pages.

* cited by examiner

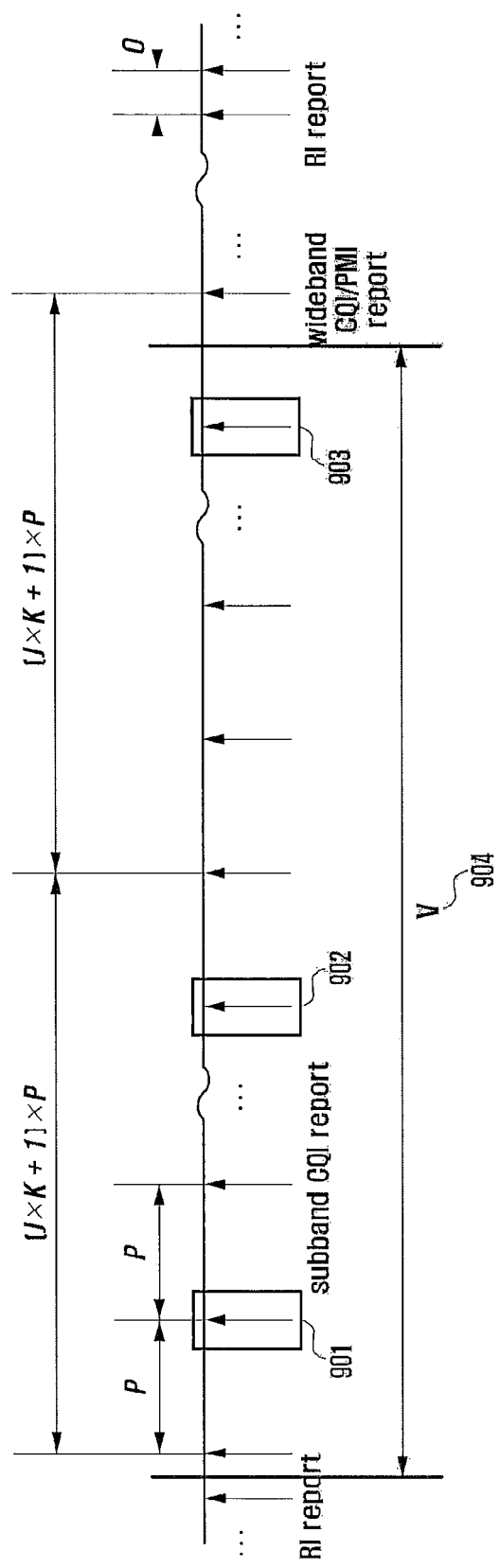

TERMINAL SIGNAL TRANSMISSION TIMING RANDOMISATION METHOD AND DEVICE IN WIRELESS COMMUNICATION SYSTEM

CROSS-REFERENCE TO RELATED APPLICATIONS

The present application claims priority under 35 U.S.C. §365 to International Patent Application No. PCT/KR2013/000265 filed Jan. 11, 2013, entitled "TERMINAL SIGNAL TRANSMISSION TIMING RANDOMISATION METHOD AND DEVICE IN WIRELESS COMMUNICATION SYSTEM". International Patent Application No. PCT/KR2013/000265 claims priority under 35 U.S.C. §365 and/or 35 U.S.C. §119(a) to Korean Patent Application No. 10-2012-0004397 filed Jan. 13, 2012 and which are incorporated herein by reference into the present disclosure as if fully set forth herein.

TECHNICAL FIELD

The present disclosure relates to a signal transmission method of a terminal in a wireless communication system and, in particular, to a method and apparatus for randomizing signal transmission timing of the terminal.

BACKGROUND ART

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services.

The existing $3^{rd}$ and $4^{th}$ generation wireless packet data communication systems (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data amount to be transmitted according to the channel condition. That is, the transmitter is capable of decreasing the data transmission amount for bad channel condition so as to fix the received signal error probability at a certain level or increasing the data transmission amount for good channel condition so as to transmit large amount of information efficiently while maintaining the received signal error probability at an intended level. Meanwhile, the channel sensitive scheduling allows the transmitter to serve the user having good channel condition selectively among a plurality of users so as to increase the system capacity as compared to allocating a channel fixedly to serve a single user. This increase in system capacity is referred to as multi-user diversity gain. Both the AMC and channel sensitive scheduling are the method of adopting the best modulation and coding scheme at the most efficient time based on the partial channel state information feedback from the receiver.

Recently, many researches are being conducted to replace Code Division Multiple Access (CDMA) used in the legacy $2^{nd}$ and $3^{rd}$ mobile communication systems with Orthogonal Frequency Division Multiple Access (OFDMA) for the next generation mobile communication system. The 3GPP and 3GPP2 are in the middle of the standardization of OFDMA-based evolved system. OFDMA is expected to provide superior system throughput as compared to the CDMA. One of the main factors that allow OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

Meanwhile, the conventional mobile communication terminal transmits a signal such as channel measurement information to the base station periodically. Such periodic signal transmission causes a frequency in a specific bandwidth which corresponds to a reciprocal of the period and the frequency is likely to incur interference on the frequency band for wired or wireless telephony.

Therefore, it is necessary for the terminal to prevent the signal transmitted periodically from causing noise to voice signal of the wired or wireless terminal.

DISCLOSURE OF INVENTION

Technical Problem

The present disclosure has been conceived to solve the above problem and aims to provide a signal transmission timing randomization method and apparatus of the terminal that is capable of preventing the terminal from generating periodic signal.

Solution to Problem

In accordance with an aspect of the present disclosure, a signal transmission method of a terminal in a wireless communication system includes receiving configuration information for randomizing transmission timing of signal to be transmitted by the terminal from a base station, determining the transmission timing of the signal based on the configuration information, and transmitting the signal at the determined transmission timing.

In accordance with another aspect of the present disclosure, a method for a base station to control signal transmission timing of a terminal in a wireless communication system includes generating configuration information for randomizing transmission timing of the signal transmitted from the terminal to the base station, transmitting the configuration information to the terminal, and receiving the signal transmitted by the terminal at the transmission timing.

In accordance with another aspect of the present disclosure, a terminal transmitting signals in a wireless communication system includes a transceiver which transmits and receives signals to and from a base station and a controller which controls receiving configuration information for randomizing transmission timing of signal to be transmitted by the terminal from a base station, determining the transmission timing of the signal based on the configuration information, and transmitting the signal at the determined transmission timing.

In accordance with still another aspect of the present disclosure, a base station for controlling signal transmission timing of a terminal in a wireless communication system includes a transceiver which transmits and receives signals to and from a terminal and a controller which controls generating configuration information for randomizing transmission timing of the signal transmitted from the terminal to the base station, transmitting the configuration information to the terminal, and receiving the signal transmitted by the terminal at the transmission timing.

Advantageous Effects of Invention

The signal transmission timing randomization method and apparatus of the present disclosure randomizes the transmission timing of a periodic signal to reduce its noise effect to a voice signal output though a speaker.

BRIEF DESCRIPTION OF DRAWINGS

FIG. 9 is a diagram illustrating a periodic signal randomization scheme according to the second embodiment of the present disclosure.

MODE FOR THE INVENTION

Exemplary embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

Figure 1:
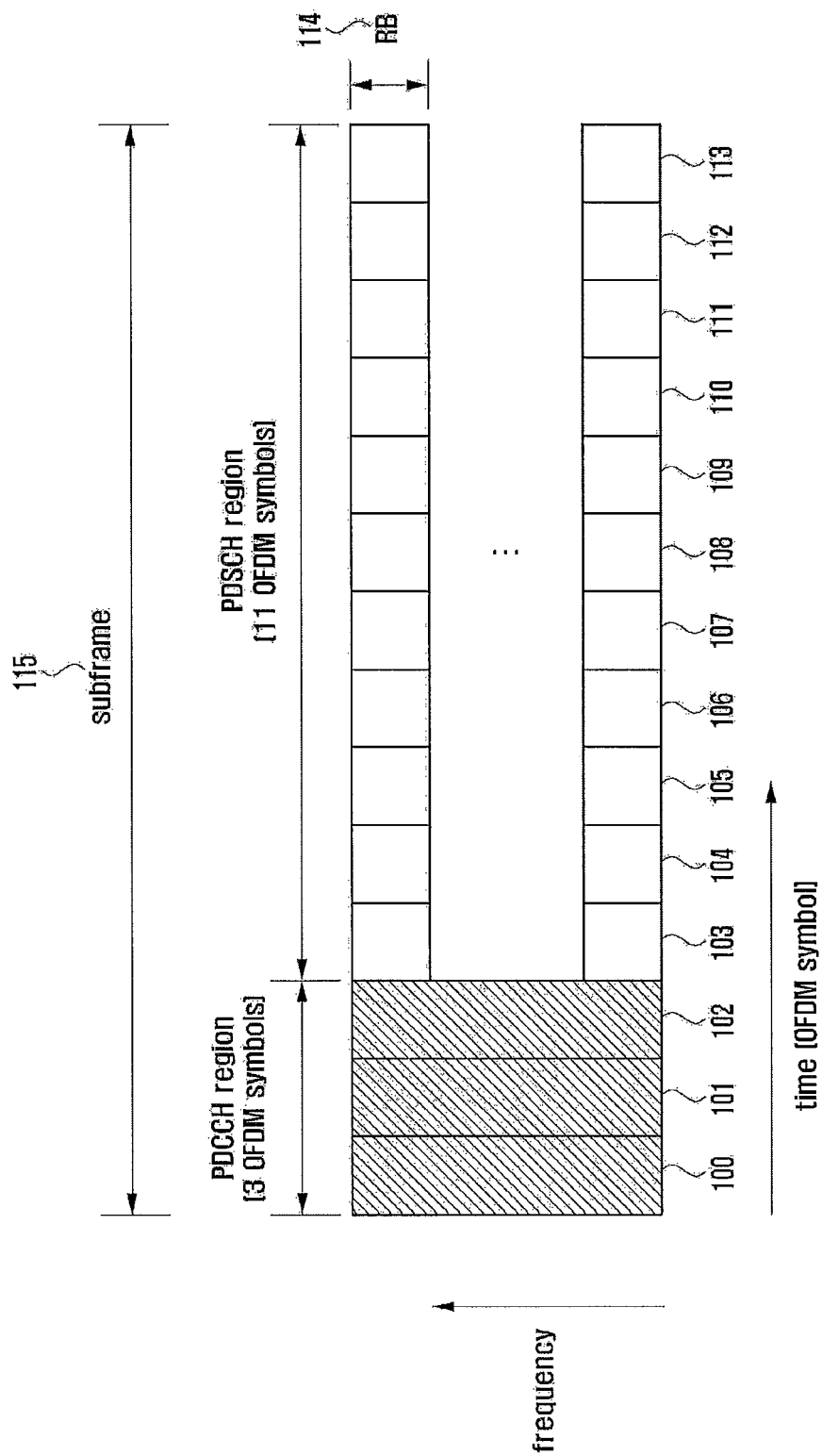
FIG. 1 is a diagram illustrating a downlink subframe structure of an LTE system.

FIG. 1 is a diagram illustrating a downlink subframe structure of an LTE system.

Referring to FIG. 1, a subframe 115 consists of 14 OFDM symbols 100 to 113 including first three OFDM symbols 100 to 102 used as a control region (Physical Downlink Control Channel (PDCCH)) and the rest OFDM symbols used as data region (Physical Downlink Data Channel (PDSCH)). Although PDCCH is transmitted in the PDCCH region 100 to 102 across the entire system bandwidth, PDSCH is transmitted by Resource Block (RB) 114 as a basic scheduling unit. Here, each RB consists of 12 subcarriers, and the number of RB varies depending on the system bandwidth. The reason for positing PDCCH at the beginning of subframe is for the terminal to check the PDCCH first and enter, if there is no data addressed to it, the micro sleep mode to save power consumption for the data channel region.

Figure 2:
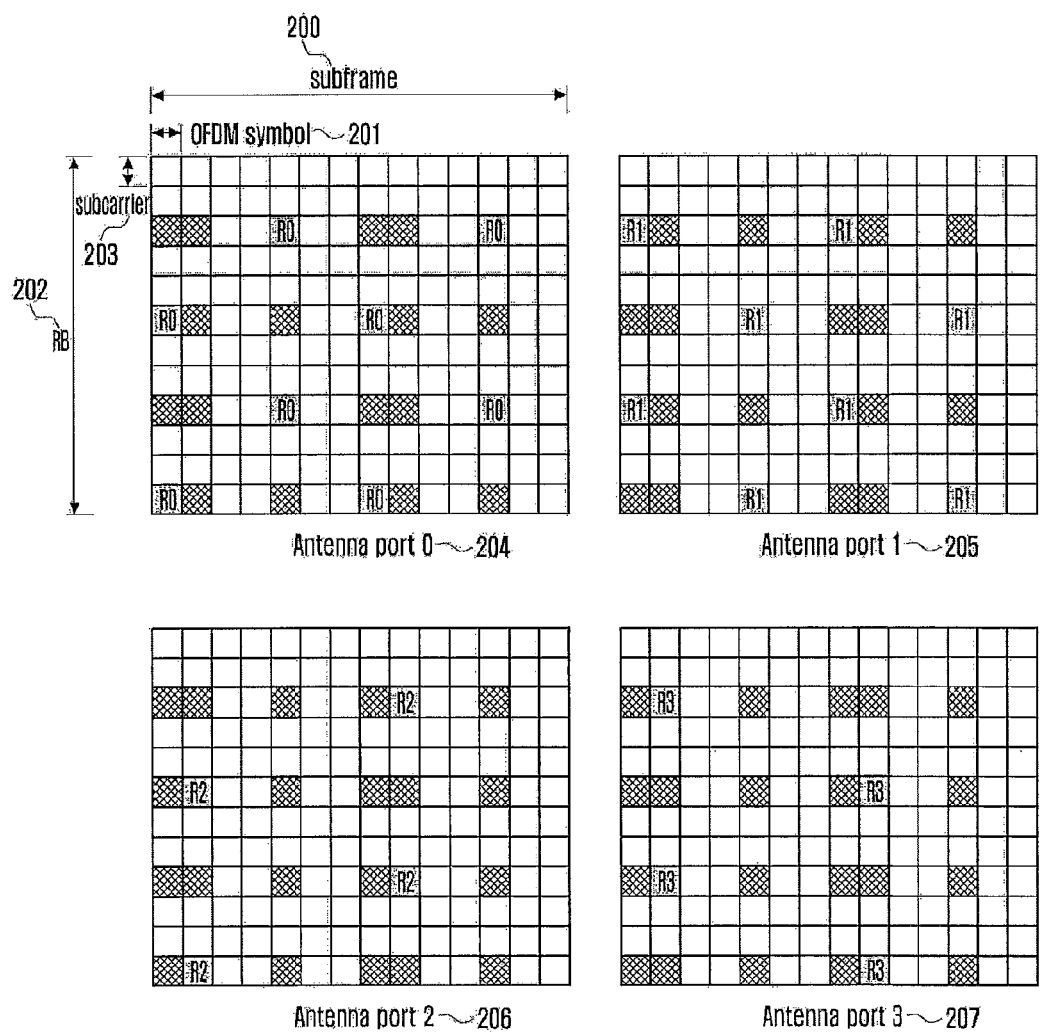
FIG. 2 is a diagram illustrating transmission patterns of downlink Common Reference Signal (CRS) for 4 transmit antennas in the LTE system.

FIG. 2 is a diagram illustrating transmission patterns of downlink Common Reference Signal (CRS) for 4 transmit antennas in the LTE system.

Referring to FIG. 2, a Resource Element (RE) is defined by one OFDM symbol 201 and one subcarrier 203, and one RB 202 in one subframe 200 consists of 12×14 REs. The receiver estimates channel states of respective transmit antennas based on the CRSs 210 to 213 corresponding to the antennas 204 to 207. In order to accomplish this, each antenna transmits null signal 208 at the RE regions of the CRSs transmitted by the other antennas as shown in FIG. 2. That is, the antenna 0 204 transmits the null signal 208 at the RE positions of CRSs 211 to 213 transmitted by other antennas 205 to 207. In one RB 202, the CRSs 210 and 211 for the antenna 0 204 and antenna 1 205 are mapped to 8 REs while the CRSs 212 and 213 for the antenna 2 206 and antenna 3 207 are mapped to 4 REs. Accordingly, in the case of 4 transmit antennas, the CRSs are transmitted using total 24 REs per RB 202. The receiver estimates channels based on the CRSs for use in demodulating PDSCH 209 and generating downlink channel information. If the purpose of the CRS is restricted to generating downlink channel state information but not channel estimation for demodulation, it is possible to reduce the number of REs for transmitting CRS in one RB 202. This is because the channel estimation error required in modulation is less than the error required in generating downlink channel state information.

The receiver receives the CRSs patterned as shown in FIG. 2 in all RBs at every subframe to estimate channel and then generates Rank Indicator (RI), Channel Quality Indicator (CQI), and Precoding Matrix Indicator (PMI) to indicate the downlink channel state.

Figure 3:
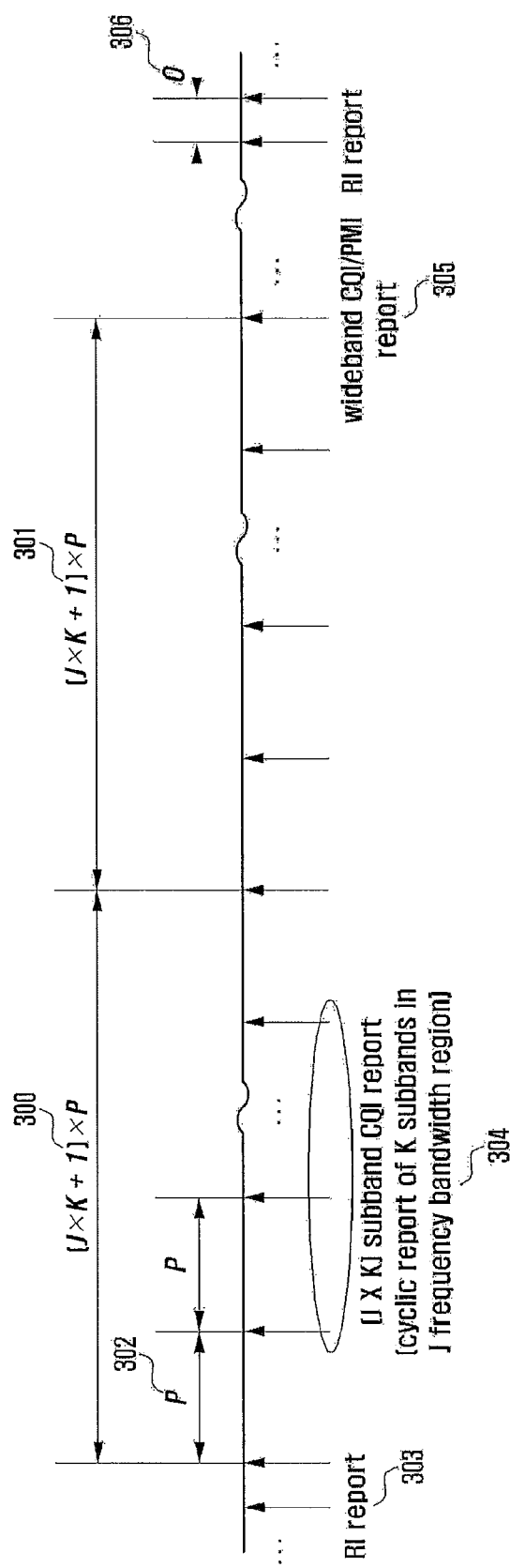
FIG. 3 is a diagram illustrating a periodic uplink feedback pattern of the LTE system.

FIG. 3 is a diagram illustrating a periodic uplink feedback pattern of the LTE system.

Referring to FIG. 3, the RI, CQI, and PMI indicating the channel state experienced by a terminal are transmitted to the base station in the uplink feedback pattern as shown in FIG. 3. The parameters P(=Np), K, M, and O for use in determining the feedback pattern are sent to the terminal through higher layer signaling and defined with respective ranges as follows.

K: number of representative subbands for CQI report, K {1, 2, 3, 4},

O: offset at RI report timing and wideband CQI/PMI report timing, O {0, −1, . . . , −(P−1), −P}, RI report interval, M {1, 2, 4, 8, 16, 32, OFF}, Np, NOFFSET,CQI: subband CQI feedback interval and offset, determined by cqi-pmi-ConfigurationIndex, MRI, NOFFSET,RI: RI report interval and offset, determined by ri-ConfigurationIndex.

Here, a subband means a group made up of one or more consecutive RBs. The delay sensitive subband CQI feedback interval 302 is relatively short as compared to the RI 303 and wideband CQI/PMI feedback 305. Since the subband CQI feedback has to be performed on the K representative subbands in J frequency band area, CQI feedback is performed for J*K subbands while the wideband CQI/PMI feedback occurs once ad denoted by reference number 304 such that the wideband CQI/PMI feedback interval becomes (J*K+1)*P (300,301). Since the RI is very insensitive to delay, it is transmitted at the longest feedback interval with the offset O 306 to avoid collision with other feedback informations.

As described above, P which is used for determining the transmission interval of the uplink feedback information may be set to one of 2, 5, 10, 20, 32, 40, 64, 80, 128, and 160 [ms] in FDD system and one of 1, 5, 10, 20, 40, 80, and 160 [ms] in TDD system. Accordingly, such a periodic signal generates a frequency such as 1000, 500, 200, 100, 50, 31.25, and 25 [Hz] by formula frequency=1/period.

Also, Sounding Reference Signal (SRS) is the signal transmitted by the terminal periodically to inform the base station of the uplink channel state, and its interval is set to one of 2, 5, 10, 20, 40, 80, 160, and 320 [ms] in the FDD system and one of 2, 5, 10, 20, 40, 80, 160, and 320 [ms] in the TDD system. Likewise, the periodic SRS transmission may generate the frequencies such as 500, 200, 100, 50, and 25 [Hz].

Meanwhile, the usual voice frequency band of the wired telephony ranges from 300 to 3400 Hz. It is noted that the frequencies of the uplink periodic signals generated by the LTE terminal are in the range of the frequency band of the voice frequency band of the wired telephony. Particularly, the signals generated by the LTE terminal at the frequency below 100 [Hz] may cause problems. If an LTE terminal is located around when using a wired phone, the periodic signal generated by the LTE terminal may influence the speaker of the wired phone such that the user of the wired phone may experience significant noise in the voice of the peer user.

Figure 4:
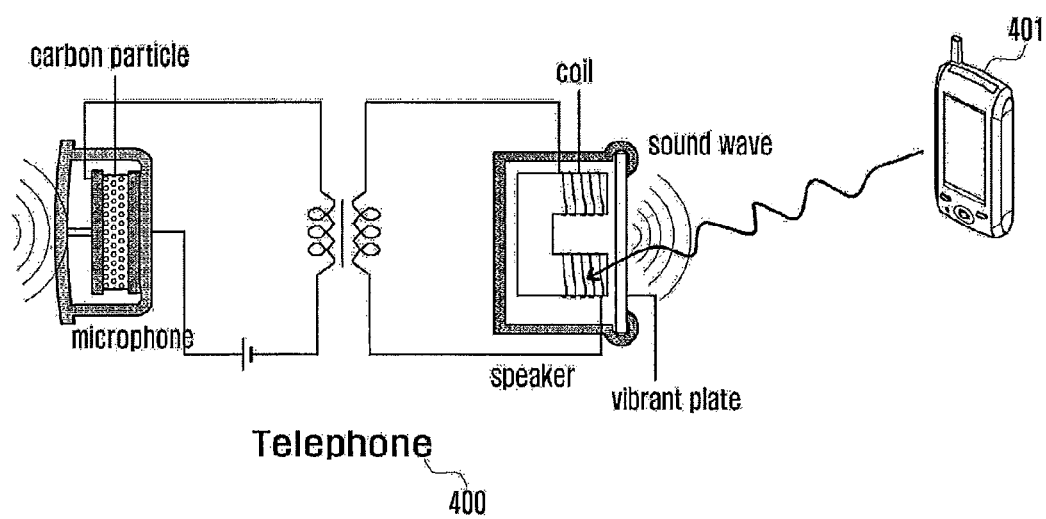
FIG. 4 is a diagram illustrating a situation where an LTE terminal incurs noise to the wired phone.

FIG. 4 is a diagram illustrating a situation where an LTE terminal incurs noise to the wired phone.

As shown in FIG. 4, the periodic signal generated by the LTE terminal flows into the speaker of the wired phone so as to add noise to the voice signal from the peer user. Although the description has been directed to the influence through the speaker of the wired phone, the same problem may occur in all of the systems using speakers outputting audible sound wave.

The present disclosure has been conceived to solve the above problem and proposes a method of randomizing the signal transmission timing of the terminal so as to break the periodicity of the periodic signal. The noise reduction effect with breakage of the periodicity of the periodic signal is proved through the experiment. A description is made of the periodic signal transmission timing randomization method with various embodiments.

Figure 5:
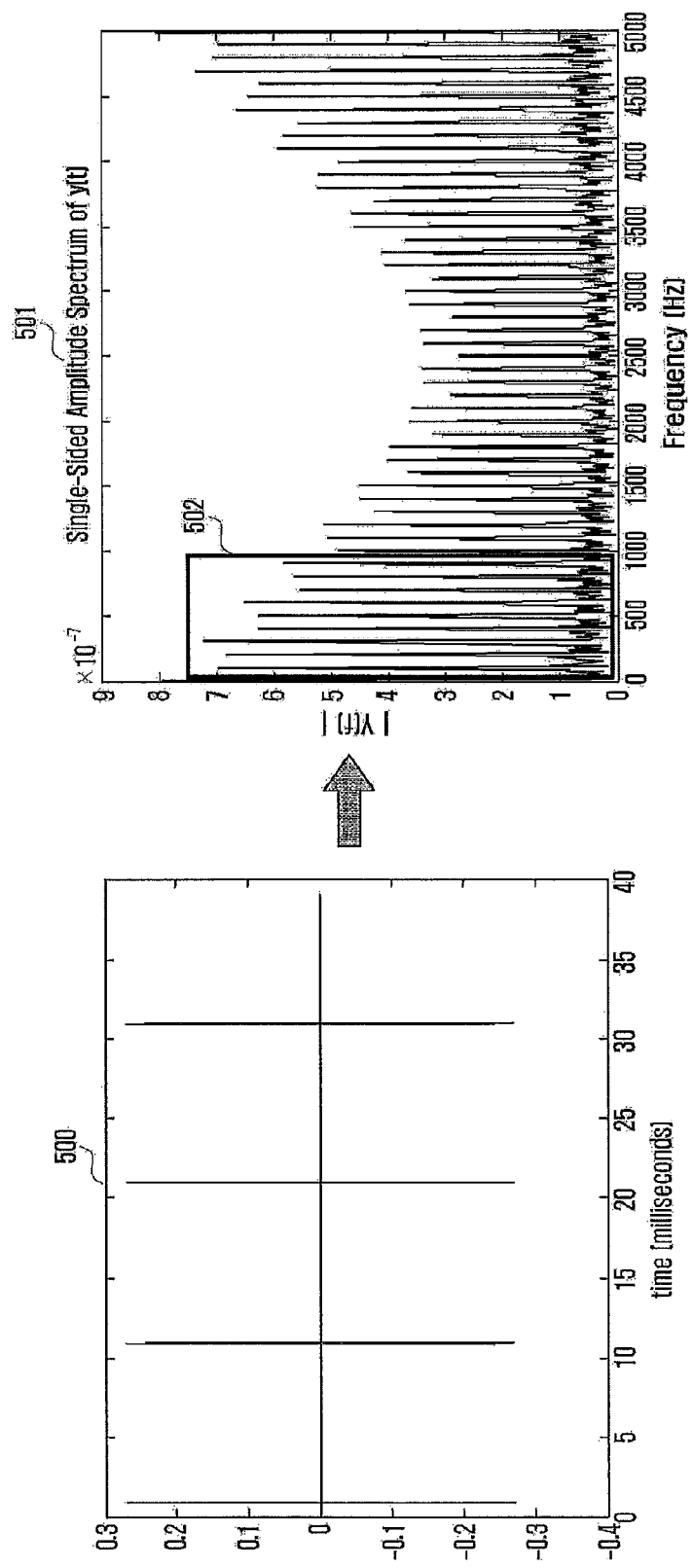
FIG. 5 is a diagram illustrating grapes of signals on the time and frequency axes under the assumption of transmission of SRS having an interval of 10 ms and fixed offset.

FIG. 5 is a diagram illustrating grapes of signals on the time and frequency axes under the assumption of transmission of SRS having an interval of 10 ms and fixed offset.

As denoted by reference number 501, integer multiple harmonics of 100 [Hz] occur in the frequency bandwidth 50 under the assumption of SRS transmission at the interval of 10 ms and, particular, the signals with strong energies are shown in the range below 1000 [Hz]. These signals may add noise to the voice signal to be output through the speaker as described above.

Figure 6:
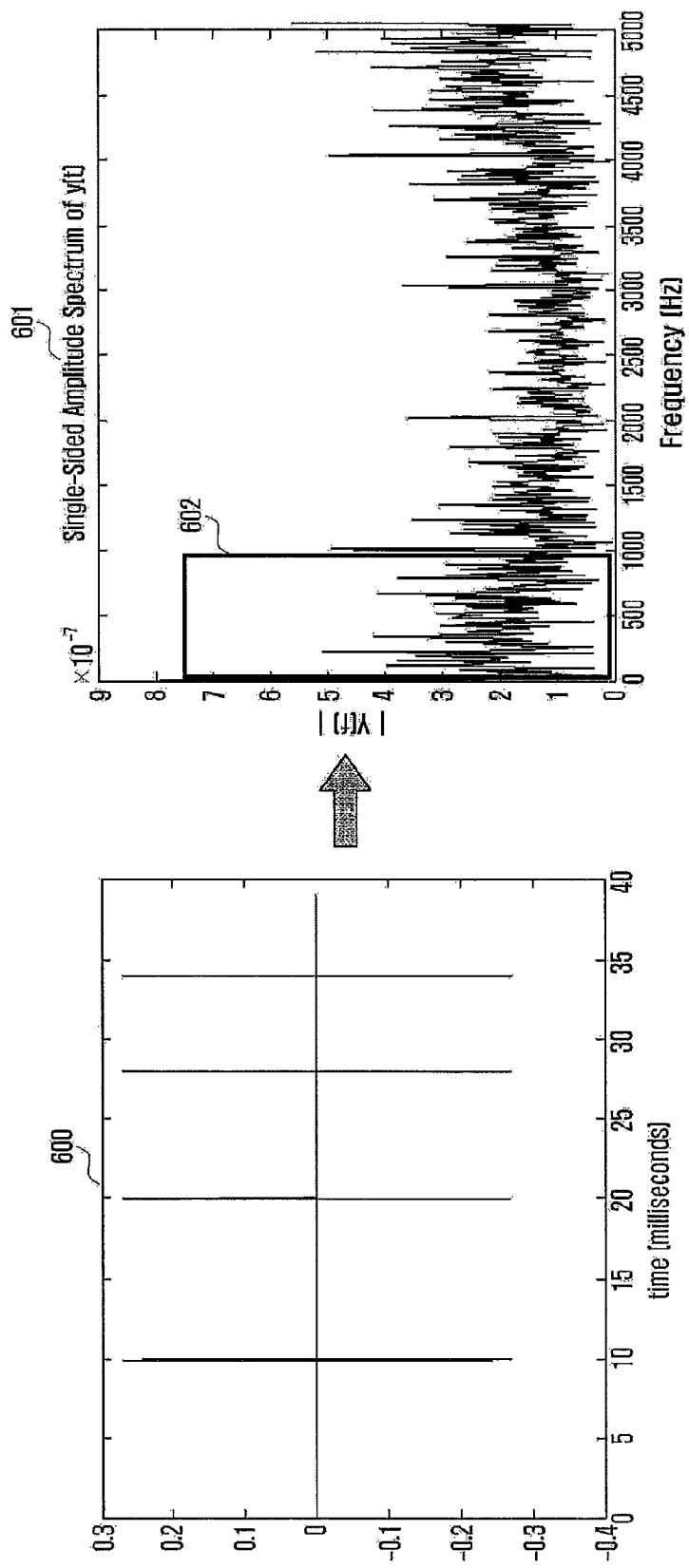
FIG. 6 is a diagram illustrating graphs of signals on the time and frequency axes under the assumption of transmission of SRS having an interval of 10 ms and randomized offset.

FIG. 6 is a diagram illustrating graphs of signals on the time and frequency axes under the assumption of transmission of SRS having an interval of 10 ms and randomized offset.

As denoted by reference number 601, the SRS transmission at the interval of 10 ms is randomized by the randomized offset such that the integer multiple harmonics of 100 Hz shown in FIG. 5 has disappeared and, in particular, the signals with storing energies has disappeared in the range below 1000 Hz. As compared to the signals denoted by reference number 502, the energies of the signals denoted by reference number 602 have been decreased approximately −7.5 dB.

A description is made of the method of randomizing the periodic signal to achieve the effect proved in the experiments of FIGS. 5 and 6 with various embodiments.

<First Embodiment>

The first embodiment of the present disclosure is directed to a method of randomizing the periodic signal transmission positions to randomize the periodic signal transmission timing.

Figure 7:
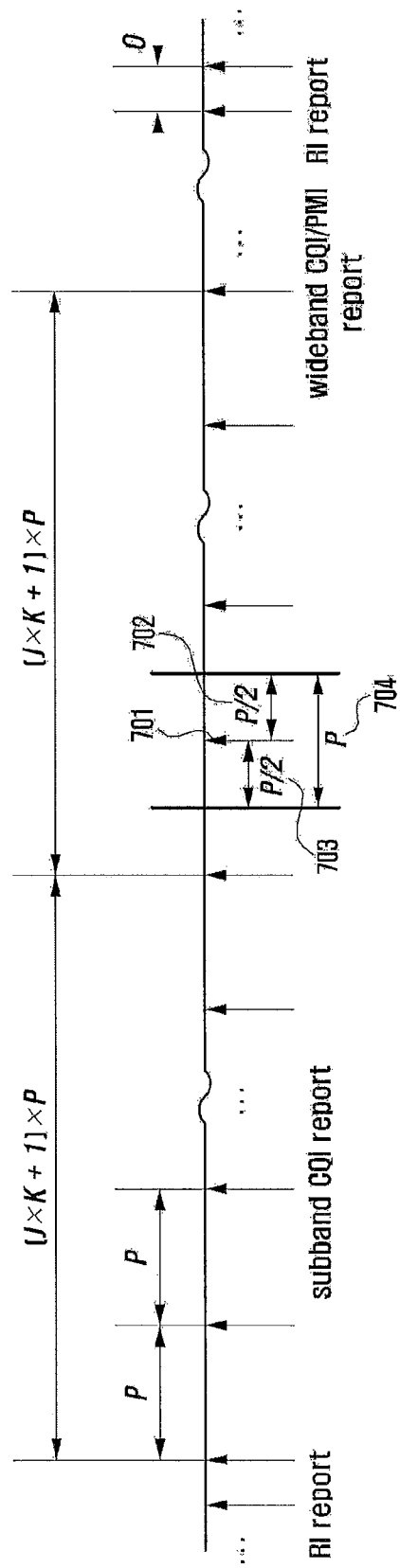
FIG. 7 is a diagram illustrating a periodic signal randomization scheme according to the first embodiment of the present disclosure.

FIG. 7 is a diagram illustrating a periodic signal randomization scheme according to the first embodiment of the present disclosure. The first embodiment of FIG. 7 is directed to the randomization of interval by randomizing the periodic signal transmission timing.

In FIG. 7, the signal 701 which has been transmitted periodically is transmitted at random position in the period 704 as a sum of the durations 702 and 703 according to the first embodiment. If the timing (subframe) for transmitting the signal is at least 1 ms in the above embodiment, the first embodiment may be applied when P is set to a value equal to or 2 ms. In the first embodiment, a random hash function preconfigured for determining the random position may be used, and the index of the subframe for the original transmission in the periodic transmission, cell identifier (ID), and terminal identifier (e.g. RNTI of terminal) may be configured as the input of the random hash function. The random hash function may be applied to all the cases in which the periodic transmissions such as channel measurement information and SRS transmissions exist. In the present disclosure, the description is directed to CQI transmission as a representative example.

The random hash function for CQI transmission may be configured as following equation. It is note that the following random hash function is just an example.

$$(10 \times n_f + \lfloor n_s/2 \rfloor - (rand(10 \times n_f + \lfloor n_s/2 \rfloor) + N_{OFFSET,CQI})) \bmod N_P = 0 \quad (1)$$

In equation (1), n_f denotes the radio frame number increasing by 10 ms. n_s denotes the slot number, and one subframe consists of 2 slots. N_OFFSET,CQI denotes the terminal-specific offset value which may be configured through higher layer signaling. N_P denotes the CQI interval.

In equation (1), the CQI transmission timing is determined at the time when the N_P value becomes 0, the random hash function included in equation (1) is expressed as formula (2):

$$rand(10 \times n_f + \lfloor n_s/2 \rfloor) \quad (2)$$

Due to the random hash function added to N_OFFSET, CQI, the offset value is set to a random value and thus the CQI transmission timing is determined randomly. The random hash function has the following properties.

First, the random hash function does not cause collision of the CQI transmission even after applying the random hash function to the periodic transmission designed without collision of the CQI transmission by setting the offset per terminal independently of the original interval. Since the function defines the output in correspondence to a certain input, it matches a sequence of a series of outputs when the input is set to a time. If the random hash function is expressed and a random sequence, at a random sequence generation method capable of fulfilling the first property, it can be considered to generate a random sequence having an alphabet corresponding to the largest transmission interval at every least CQI transmission interval, decimate the generated random sequence, and takes modulo at the interval of alphabet in generating the sequence corresponding to each interval.

Assuming maximum CQI transmission interval of 40 ms and random sequence having 40 alphabets which is generated at every 5 ms, it can be generated as follows. The 40 alphabets are represented by numbers from 0 to 39 herein.

10, 17, 32, 26, 14, 15, 2, 16, 30, 34, 36, 38, 28, 25, 27, 18, 12, 19, 24, 33, 8, 37, 1, 9, 35, 31, 5, 22, 6, 11, 20, 21, 23, 13, 3, 4, 7, 39, 29, 0, 10, 17, 32, 26, 14, 15, 2, 16, 30, 34, 36, 38, 28, 25, 27, 18, 12, 19, 24, 33, 8, 37, 1, 9, 35, 31, 5, 22, 6, 11, 20, 21, 23, 13, 3, 4, 7, 39, 29, 0, . . .

This random sequence is decimated to generate a random value for each interval as arranged in the following table, and modulo is taken for the interval.

has to fulfill the second property too. The Sidelnikove sequence is the sequence fulfilling the second property. The Sidelnikove sequence has a length of Zm−1, and its alphabet size is a measure of Zm−1. Here, Z is a prime. For more information on Sidelnikove sequence, refer to:

[1] V. M. Sidelnikove, "Some k-valued pseudo-random sequences and nearly equidistant codes," Probl. Inf. Transm., vol. 5, pp. 12-16, 1969.,
[2] N. Y. Yu and G. Gong, "Multiplicative Characters, The Weil Bound, and Poly Sequence Families With Low Correlation," Technical Report, CACR 2009-25, 2009, University of Waterloo, Canada.

Figure 8A:
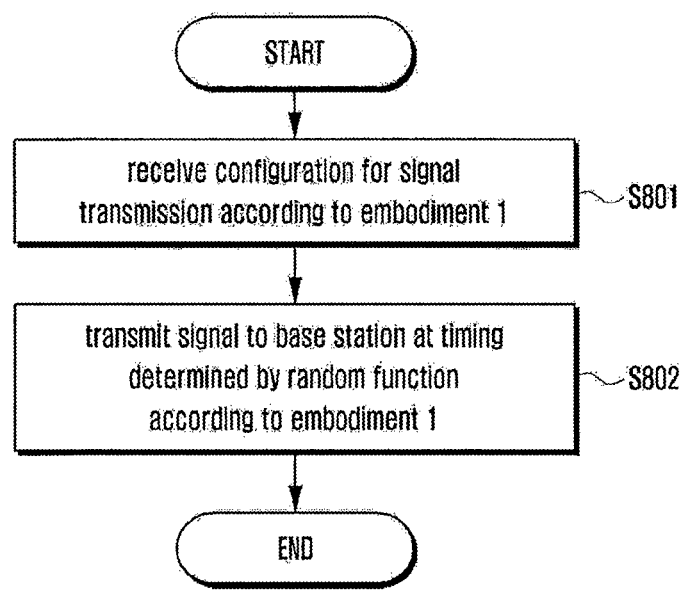
FIG. 8a is a flowchart illustrating the operation procedure of the terminal according to the first embodiment of the present disclosure.

FIG. 8a is a flowchart illustrating the operation procedure of the terminal according to the first embodiment of the present disclosure.

At operation S801, the terminal receives the configuration information for transmitting signals from the base station according to the first embodiment. The configuration information is the configuration information for randomizing transmission timings of the signals to be transmitted to the base station, e.g. channel measurement information and SRS.

According to the first embodiment of the present disclosure, the transmission timing randomization method includes determining the transmission position of the signal in a certain duration using a random hash function.

The terminal transmits the signal to the base station according to the determined timing at operation S802. That is, the terminal transmits the signal to the base station at the

TABLE 1

|  | 0 | 1 | 2 | 3 | 4 | 5 | 6 | 7 | 8 | 9 | 10 | 11 | 12 | 13 | 14 | 15 | 16 | 17 | 18 | 19 | ... | 37 | 38 | 39 | 40 | 41 | 42 | 43 | ... |
|---|---|---|---|---|---|---|---|---|---|---|---|---|---|---|---|---|---|---|---|---|---|---|---|---|---|---|---|---|---|
| original | 10 | 17 | 32 | 26 | 14 | 15 | 2 | 16 | 30 | 34 | 36 | 38 | 28 | 25 | 27 | 18 | 12 | 19 | 24 | 33 | ... | 39 | 29 | 0 | 10 | 17 | 32 | 26 | ... |
| 5 ms | 0 | 2 | 2 | 1 | 4 | 0 | 2 | 1 | 0 | 4 | 1 | 3 | 3 | 0 | 2 | 3 | 2 | 4 | 4 | 3 | ... | 4 | 4 | 0 | 0 | 2 | 2 | 1 | ... |
| 10 ms | 0 |  | 2 |  | 4 |  | 2 |  | 0 |  | 6 |  | 8 |  | 7 |  | 2 |  | 4 |  | ... |  | 9 |  | 0 |  | 2 |  | ... |
| 20 ms | 10 |  |  |  | 14 |  |  |  | 10 |  |  |  | 8 |  |  |  | 12 |  |  |  | 13 | ... |  |  |  | 10 |  |  |  | ... |
| 40 ms | 10 |  |  |  |  |  |  |  | 30 |  |  |  |  |  |  |  | 12 |  |  |  |  | ... |  |  |  | 10 |  |  |  | ... |

By adding the terminal-specific offset NOFFSET,CQI configured originally for the terminal to the random sequence corresponding to the respective intervals in table 1, the transmission positions of the respective terminals at the interval are determined. At this time, since the differentiated transmission intervals of the CQIs are relatively short and results in the same value by taking modulo, the first property of no collision of CQI transmissions is fulfilled as before when the terminal-specific N_OFFSET,CQI is applied. Suppose the CQI transmission at interval of 5 ms and the CQI transmission at interval of 20 ms are prevented against collision at every 20 ms by adding N_OFFSET,CQI thereto. In table 1, the random sequence generated at the interval of 5 ms has the value of 0, 4, 0, 3, 2, . . . and the random sequence generated at the interval of 20 ms has the value of 10, 14, 10, 8, 12, . . . , respectively. Comparing the random sequences of 5 ms and 20 ms at the interval of every 20 ms, taking modulo 5 results in the same value always so as to guarantee the generation of different values by adding N_OFFSET,CQI.

Secondly, the sequences corresponding to the respective intervals generated as shown in table 1 have random characteristics and the alphabets corresponding to the sequences have to occur uniformly.

That is, when the sequence has been generated using the sequence generation method fulfilling the first property, it transmission timing obtained by randomizing the periodic transmission timing with the random function.

Figure 8B:
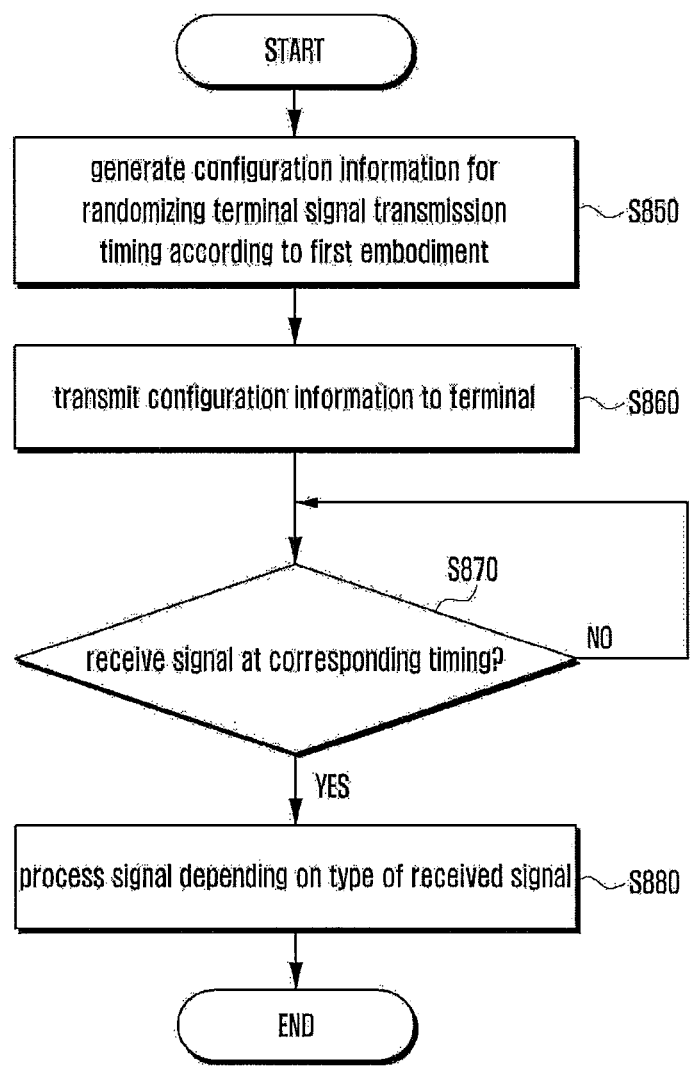
FIG. 8b is a flowchart illustrating the operation procedure of the base station according to the first embodiment of the present disclosure.

FIG. 8b is a flowchart illustrating the operation procedure of the base station according to the first embodiment of the present disclosure.

According to the first embodiment, the base station generates configuration information for randomizing the signal transmission timing of the terminal at operation S850. As described above, the configuration information is the information for use in randomizing transmission positions of the signals in a certain duration using a random hash function.

The base station transmits the configuration information to the terminal at operation S860. In this case, the base station may transmit the configuration information to the terminal through higher layer signaling such as RRC layer signaling.

Next, the base station determines whether a signal such as SRS and channel measurement information is received from the terminal at the corresponding timing at operation S870.

If a signal is received, the base station processes the corresponding signal depending on the type of the signal at operation S880. For example, if the received signal is SRS, the base station estimates the channel with the terminal and, if the received signal is the channel measurement information, performs scheduling the terminal based thereon.

<Second Embodiment>

The second embodiment of the present disclosure proposes a method of muting some of the periodic transmission signals randomly to randomize the transmission timing of the periodic transmission signal.

FIG. 9 is a diagram illustrating a periodic signal randomization scheme according to the second embodiment of the present disclosure.

According to the second embodiment of FIG. 9, the terminal is configured to mute the periodic transmission signal at some transmission occasions 901, 902, and 903 randomly so as to randomize the signal transmission interval.

The second embodiment of the present disclosure differs from the second embodiment of FIG. 7 in that it can be applicable independently of the signal transmission interval P. In FIG. 9, the size of the window (V) 904 for randomizing the signal transmission timing and the number of transmission signals to be muted in the window (V) 904 are preconfigured.

FIG. 9 shows an exemplary case wherein three transmission signals are muted in the window (V) 904.

The size of the window (V) 904 and the number of transmission signals to be muted may be configured through higher layer signaling. In order to determine the signal transmission positions to be muted randomly within the window (V) 904, a predefined random hash function may be used with the input of number of signals muted accumulatively, cell ID, RNTI of terminal. The random hash function may be applicable to all the cases in which CQI and/or SRS transmissions occur periodically.

According to an embodiment of the present disclosure, the resources at which the signal transmissions of specific terminal are muted may be allocated to other terminal. In order to compensate for the channel estimation performance degradation caused by muting the transmission signals, aperiodic channel information request or aperiodic SRS transmission may be activated by the base station.

Figure 10:
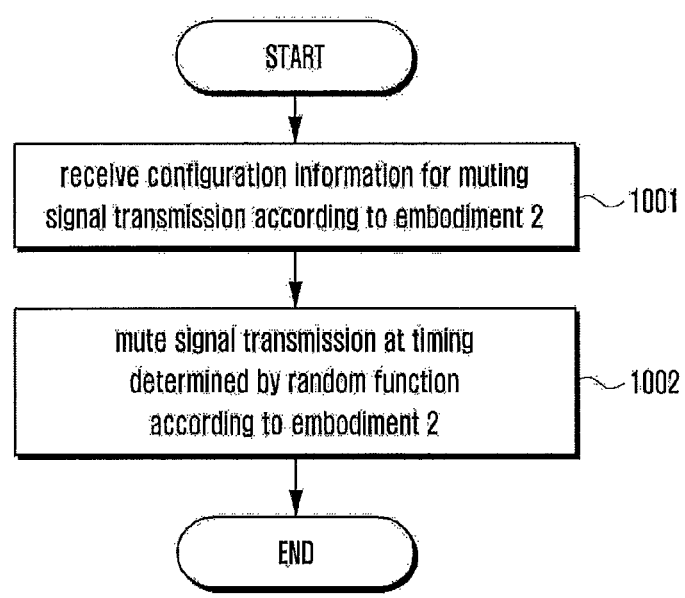
FIG. 10 is a flowchart illustrating the operation procedure of the terminal according to the second embodiment of the present disclosure.

FIG. 10 is a flowchart illustrating the operation procedure of the terminal according to the second embodiment of the present disclosure.

According to the second embodiment of the present disclosure, the terminal receives the configuration information for muting some of periodic transmission signals from the base station at operation S1001. The configuration information may include at least one of the size of the window in which the signal transmission is muted randomly and the number of signals to be muted actually within the window.

Next, the terminal mutes the periodic transmission signal at the timing determined by a random function at operation S1002.

Since the operation procedure of the base station according to the second embodiment of the present disclosure is similar to that of the first embodiment, detailed description is omitted herein. However, there is a difference in that the configuration information transmitted from the base station to the terminal includes the information for use in muting the periodic transmission signal randomly.

<Third Embodiment>

The third embodiment of the present disclosure proposes a method of transmitting additional signal between periodic transmission timings of the periodic signal to randomize the transmission timing of the periodic transmission signal.

Figure 11:
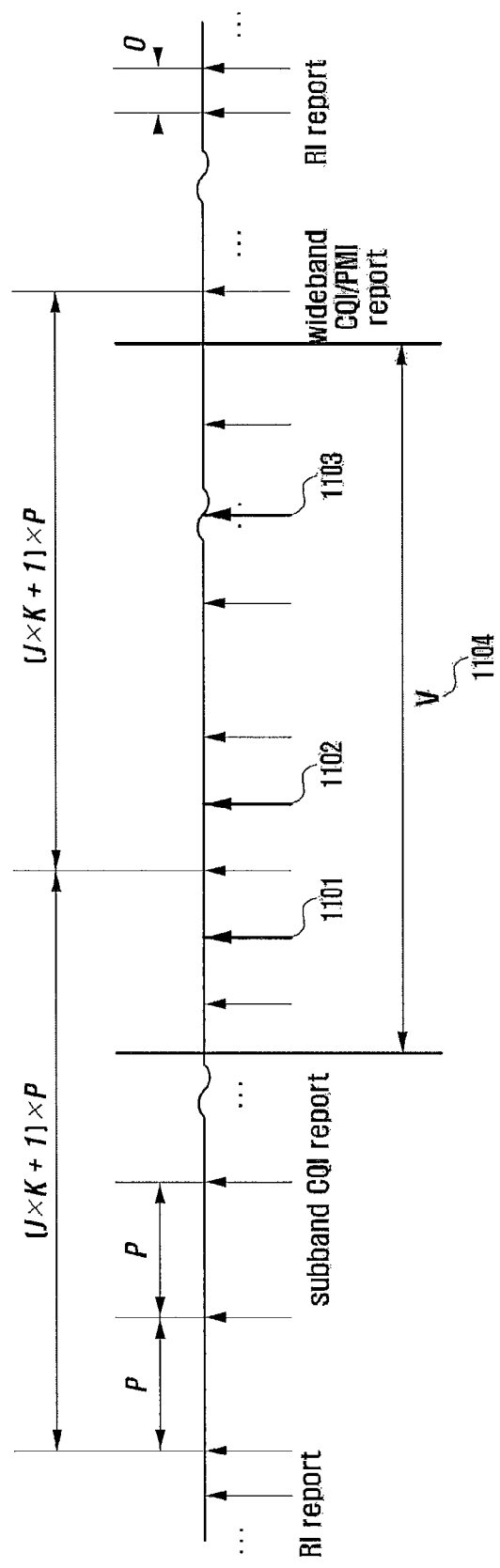
FIG. 11 is a diagram illustrating a periodic signal randomization scheme according to the third embodiment of the present disclosure.

FIG. 11 is a diagram illustrating a periodic signal randomization scheme according to the third embodiment of the present disclosure.

As shown in FIG. 11, the third embodiment proposes a method of randomizing the signal transmission timing by transmitting additional signals between the periodically transmitted signals as denoted by reference numbers 1101, 1102, and 1103. At this time, the signals to be transmitted additionally is designed such that the energy level of the frequency band causing interference of the periodically transmitted signal to the speaker is reduced. If the least signal transmission timing is 1 ms, the third embodiment is applicable when P is set to a value equal to or greater than 2 ms.

First, a description is made of the method of configuring the transmission position and number of the signals to be transmitted additionally according to the third embodiment of the present disclosure.

In FIG. 11, the window for transmitting additional signal (V) 1104 and the number of signals to be transmitted additionally within the window (V) 1104 are preset. FIG. 11 is directed to the case where the number of signals to be transmitted additionally within the window (V) 1104 is set to 3. The window (V) 1104 and the number of signals to be transmitted additionally may be configured through higher layer signaling.

In order to determine the additional signal transmission position randomly within the window (V) 1104, a predefined random hash function may be used with the input of the number of signals to be transmitted additionally, cell ID, and RNTI of the terminal. The random hash function may be applicable to all the cases where the any periodic transmission such as CQI and SRS transmission exists.

According to the third embodiment, the resources for transmitting the additional signals have to be preconfigured through a certain method such as higher layer signaling.

In an embodiment of the present disclosure, the signals to be transmitted additionally may have random values or include important channel information such as RI and RI/PTI.

Next, a description is made of the method of changing the transmission position and number of additional signals dynamically. In FIG. 11, the base station may activate aperiodic channel information or aperiodic SRS randomly on PDCCH as downlink control channel without pre-configuration of the window (V) 1104 and the number of signals to be transmitted additionally. At this time, the SRS or CQI activation may increase PDCCH overhead. Accordingly, there is a need of introducing new PDCCH capable of activating aperiodic channel informations or aperiodic SRSs of plural terminals. The new PDCCH allows for the terminals to perform decoding with cell-specific RNTIs and multiplexing the informations for use in activating the aperiodic channel informations and aperiodic SRSs of the plural terminals on the PDCCH. The resources for transmitting the aperiodic channel informations or aperiodic SRSs may be allocated through higher layer signaling.

Figure 12:
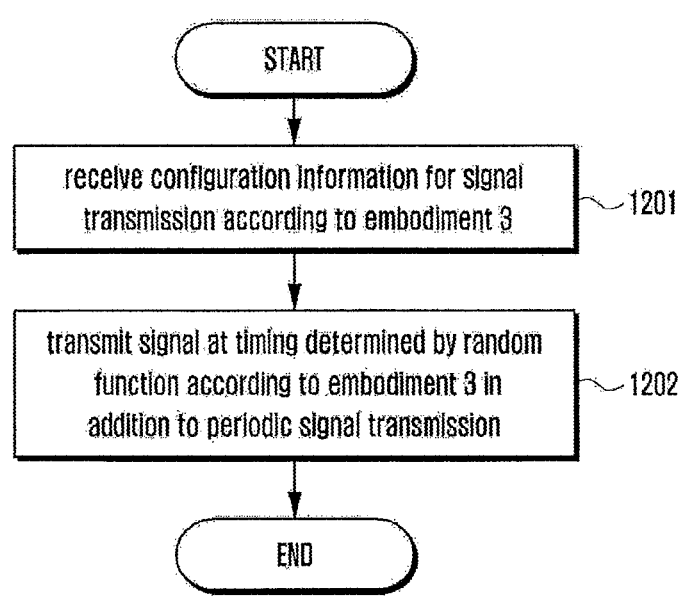
FIG. 12 is a flowchart illustrating the operation procedure of the terminal according to the third embodiment of the present disclosure.

FIG. 12 is a flowchart illustrating the operation procedure of the terminal according to the third embodiment of the present disclosure. In the third embodiment of FIG. 12, the positions and number of signals to be transmitted additionally are configured through higher layer signal and the terminal transmits the additional signals according to the configuration.

According to the third embodiment, the terminal receives the configuration as described with reference to FIG. 11 for transmitting signals at operation S1201. That is, the terminal receives the configuration information including at least one of window size for transmitting additional signals and number of signals to be transmitted additionally within the window from the base station.

According to the third embodiment, the terminal transmits to the base station the additional signal at the timing determined by the random function in addition to the signals transmitted periodically at operation S1202. In this case, the additional signal transmission timing is defined such that the energy level of the signal transmitted periodically by the terminal on the frequency band decreases.

Since the operation procedure of the base station according to the third embodiment of the present disclosure is similar to those of the first and second embodiments, detailed description thereon is omitted herein. However, there is a difference in that the configuration information transmitted from the base station to the terminal includes at least one of the window size for transmitting the additional signals and the number of signals to be transmitted within the window.

A description is made of multiplexing the new terminals supporting the periodic signal transmission randomization of any of embodiments 1 to 3 and legacy terminals hereinafter with reference to FIG. 13.

Figure 13:
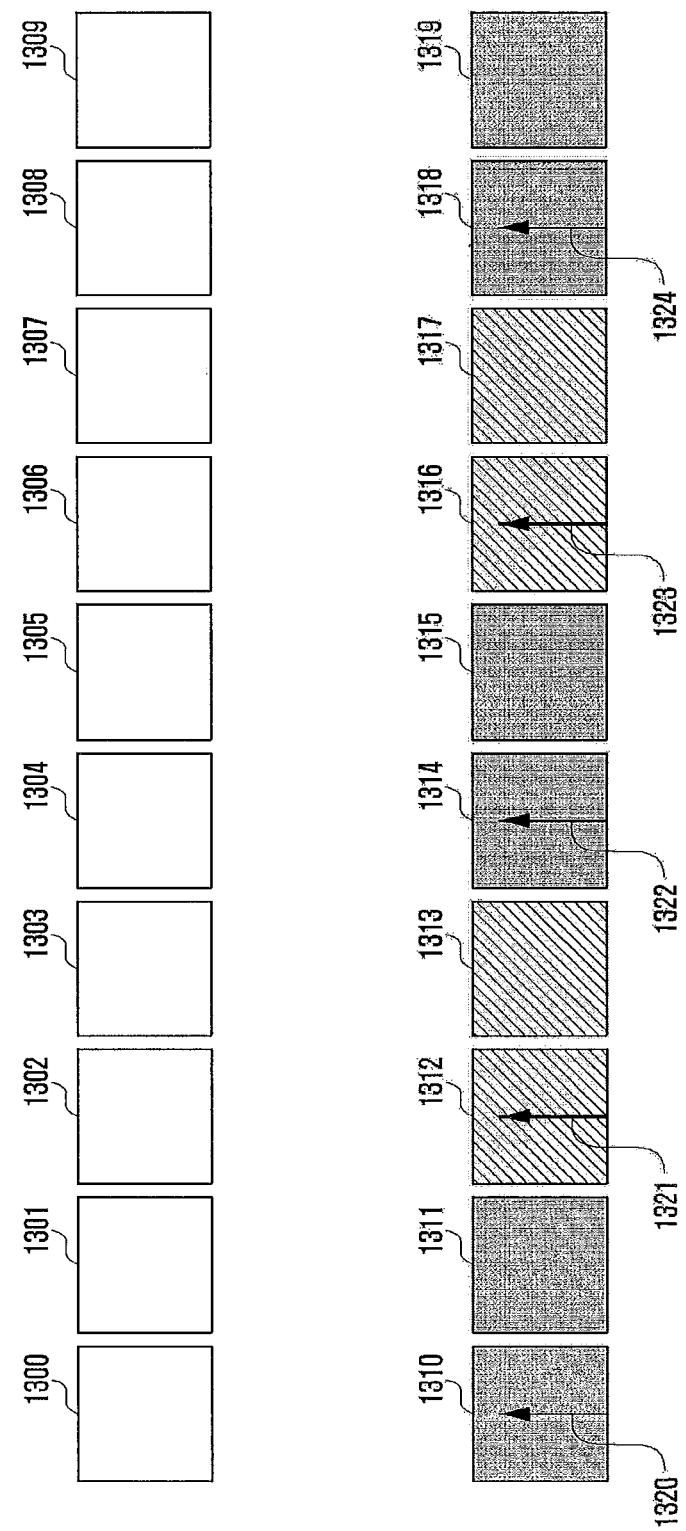
FIG. 13 is a diagram illustrating a method of discriminating between the SRS transmission subframes of the new terminals capable of supporting and old terminals incapable of supporting the methods of the first to third embodiments.

FIG. 13 is a diagram illustrating a method of discriminating between the SRS transmission subframes of the new terminals capable of supporting and old terminals incapable of supporting the methods of the first to third embodiments.

Reference numbers 1300 to 1309 denote cell-specific SRS transmission subframes spanning 10 ms, each subframe having a length of 1 ms.

Reference numbers 1310, 1311, 1314, 1315, 1318, and 1319 denote the subframes capable of allowing the legacy terminal to transmit SRS; and 1312, 1313, 1316, and 1317 denote the subframes capable of allowing the new terminals supporting the methods according to the embodiments 1, 2, and 3 of the present disclosure.

The subframes 1310, 1311, 1314, 1315, 1318, and 1319 and the subframes 1312, 1313, 1316, and 1317 may be configured in terminal-specific manner through higher layer signaling.

The legacy terminals transmit the SRS 1320, 1322, and 1324 at the subframes 1310, 1314, and 1318 to the base station as configured among the subframes 1310, 1311, 1314, 1315, 1318, and 1319; and the new terminals capable of supporting the methods according to the first to third embodiments transmit the SRS 1321 and 1323 at the subframes 1312 and 1316 according to any of the method according to the first to third embodiments. Although FIG. 13 is directed to the SRS, the present disclosure is applicable to periodic transmission signal such as CQI and CSI.

Figure 14:
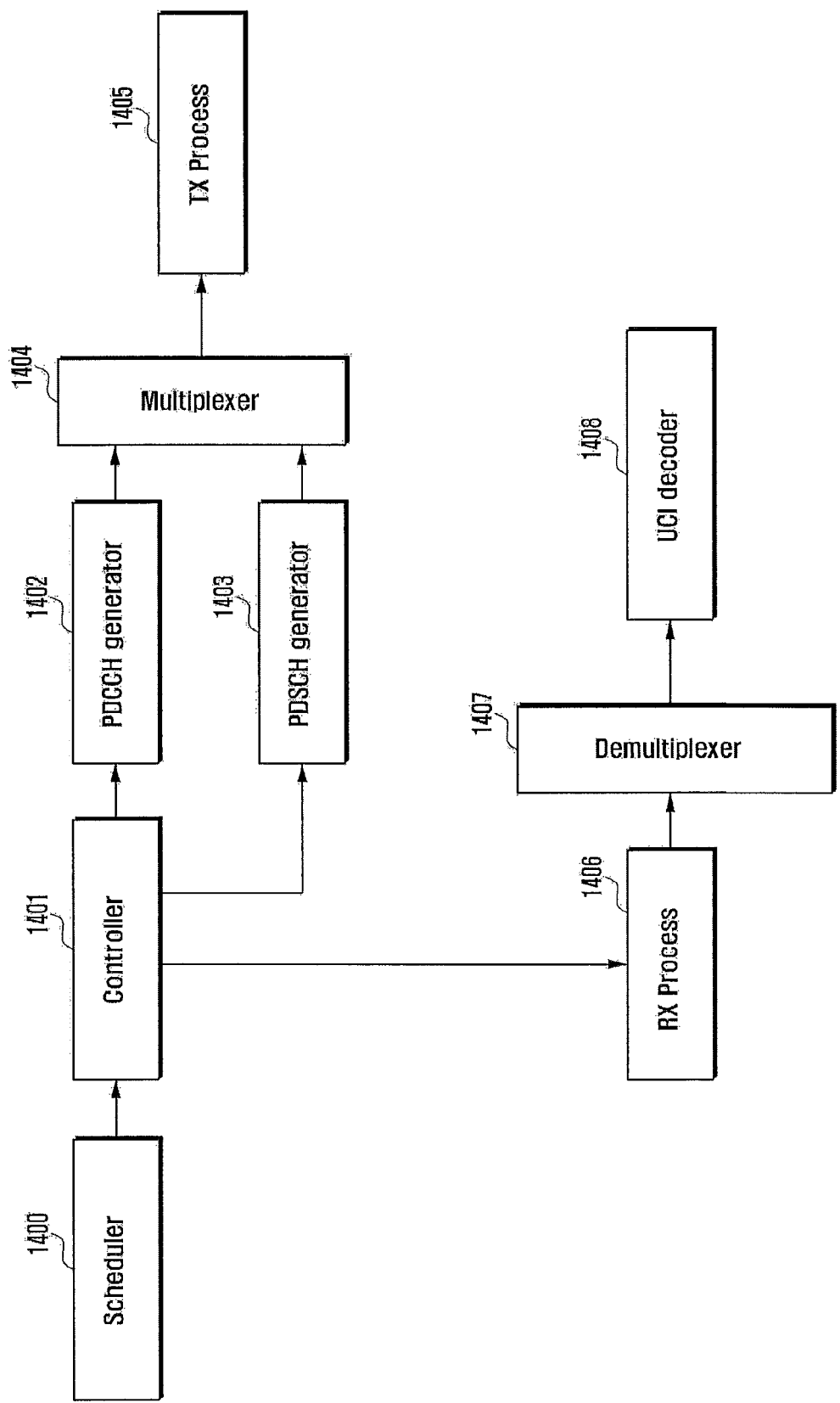
FIG. 14 is a block diagram illustrating a configuration of the base station according to an embodiment of the present disclosure.

FIG. 14 is a block diagram illustrating a configuration of the base station according to an embodiment of the present disclosure.

The scheduler 1400 and the controller 1401 control the PDCCH generator 1402 and the PDSCH generator 1403 to generate PDCCH and PDSCH respectively and control the multiplexer 1404 to multiplex PDCCH and PDSCH and send the multiplexed signal to the transmitter 1405. According to the first to third embodiments of the present disclosure, the base station receives the uplink signals by means of the receiver 1406, demultiplexes channel informations including CQI and SRS informations by means of the demultiplexer 1407, and decodes the signals by means of the UCI decoder 1408.

According to any of the first to third embodiments of the present disclosure, the controller 1400 controls to configure the information necessary for randomizing the periodic transmission signals and transmit the configuration information to the terminal.

In more detail, the controller 1400 generates the configuration information for randomizing the transmission timing of the signals transmitted from the terminal to the base station and transmits the configuration information to the terminal. The controller 1400 may transmit the configuration information to the terminal through higher layer signaling such as RRC signaling.

In the first embodiment, the configuration information generated by the controller 1400 may include the information for use in determining the signal transmission positions randomly within a signal transmission time window predetermined for the terminal. In this case, the configuration information may include a random hash function preconfigured for determining the random positions and the size of the periodic signal transmission window.

In the second embodiment, the configuration information may include the information for use in determining the signal transmission timing by muting some signals randomly among the periodic transmission signals. In this case, the configuration information may include at least one of the window size in which the signal is muted randomly and the number of signals to be muted within the window.

In the third embodiment, the configuration information may include the information for use in determining the transmission timings of a number of additional signals predetermined between the periodic transmission signals. In this case, the configuration information may include at least one of the size of window for transmitting the additional signals and a number of the signals to be transmitted additionally within the window.

Figure 15:
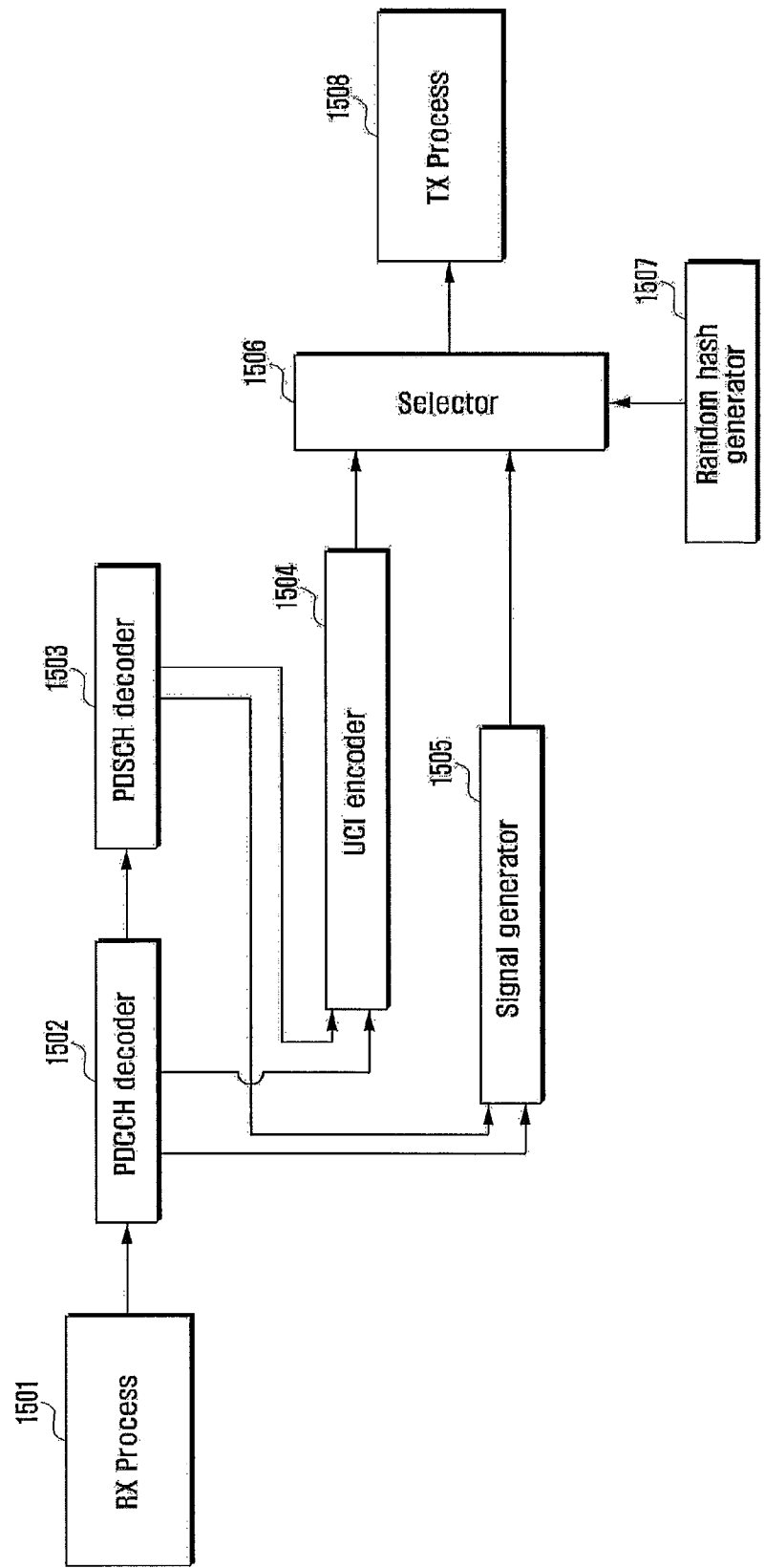
FIG. 15 is a block diagram illustrating a configuration of the terminal according to an embodiment of the present disclosure.

FIG. 15 is a block diagram illustrating a configuration of the terminal according to an embodiment of the present disclosure.

The terminal receives the signal by means of the receiver 1501, decodes the signal into PDCCH by means of the PDCCH decoder 1502, and decodes the PDSCH using the PDCCH by means of the PDSCH decoder 1503. The configuration information is acquired from the PDSCH information according to one of the first to third embodiments of the present disclosure. The terminal generates the channel information such as CQI and SRS configured to be transmitted periodically by means of the UCI encoder 1504.

According to an embodiment of the present disclosure, the terminal generates signals by means of the signal generator 1505, selects the periodic signal by means of the selector 1506 on the basis of the configuration information acquired through PDSCH and the value generated by the random hash function generator 1507, and transmits the signal by means of the transmitter 1508 at the transmission timing.

According to an embodiment of the present disclosure, the signal flows among the blocks may be performed under the control of a controller (not shown). In this case, the controller may control receiving the configuration for use in randomizing the transmission timing of the signal to be transmitted by the terminal and determine the transmission timing of the terminal based on the configuration information. The controller may control transmitting the signal to the base station according to the determined transmission timing.

Since the method of determining the transmission timing of the signal has been described in the first to third embodiments of the present disclosure, detailed description thereof is omitted herein.

The invention claimed is:

1. A signal transmission method of a terminal in a wireless communication system, the method comprising:
receiving configuration information for randomizing a transmission timing of signal to be transmitted by the teiminal from a base station;
determining the transmission timing of the signal using a random hash function and a terminal-specific offset based on the configuration information, the terminal-specific offset being configured by signaling of a higher layer; and
transmitting the signal at the determined transmission timing.

2. The method of claim 1, wherein the determining of the transmission timing comprises:
determining transmission positions of the terminal randomly within a predetermined duration allowed for transmitting the signal.

3. The method of claim 1, wherein the determining of the transmission timing comprises determining transmission positions of the terminal randomly using the random hash function having receiving input of at least one of an index of subframe for periodic transmission, cell identifier, and terminal identifier.

4. The method of claim 3, wherein the random hash function is defined to randomize the transmission timing of the signal without collision with signals transmitted other terminals even after randomization.

5. The method of claim 3, wherein the random hash function is defined to generate sequences randomly and distribute all alphabet values included in the sequences uniformly.

6. The method of claim 1, wherein the determining of the transmission timing comprises muting some of the signals to be periodically transmitted by the terminal randomly.

7. The method of claim 1, wherein the determining of the transmission timing comprises inserting a predetermined number of additional signals between the signals transmitted from the terminal to the base station periodically.

8. The method of claim 7, wherein the predetermined number of additional signals are defined to reduce energy level of the signal transmitted periodically on a frequency band.

9. A method for a base station to control signal transmission timing of a terminal in a wireless communication system, the method comprising:
generating configuration information for randomizing transmission timing of the signal transmitted from the terminal to the base station;
transmitting the configuration information to the terminal; and
receiving the signal transmitted by the terminal at the transmission timing,
wherein the transmission timing of the signal is determined by the terminal using a random hash function and a terminal-specific offset based on the configuration information, the terminal-specific offset being configured by higher layer signaling.

10. The method of claim 9, wherein the configuration information comprises information to configure the terminal to determine transmission positions of the signals randomly within a predetermined duration allowed for the terminal to transmit the signal.

11. The method of claim 10, wherein the configuration information comprises the random hash function for determining the transmission positions of the signal randomly, the random hash function receiving an input of at least one of an index of subframe for periodic transmission, cell identifier, and terminal identifier.

12. The method of claim 11, wherein the random hash function is defined to randomize the transmission timing of the signal without collision with signals transmitted other terminals even after randomization.

13. The method of claim 12, wherein the random hash function is defined to generate sequences randomly and distribute all alphabet values included in the sequences uniformly.

14. The method of claim 9, wherein the configuration information comprises information for use in configuring the transmission timing of the signal by muting some of the signals to be periodically transmitted by the terminal randomly.

15. The method of claim 9, wherein the configuration information comprises information for use in determining the transmission timing of the signal by inserting a predetermined number of additional signals between the signals transmitted from the terminal to the base station periodically.

16. The method of claim 15, wherein the configuration information is defined to reduce energy level of the signal transmitted periodically on a frequency band.

17. A terminal transmitting signals in a wireless communication system, the terminal comprising:
a transceiver configured to transmit and receive signals to and from a base station; and
a controller configured to control receiving configuration information for randomizing a transmission timing of signal to be transmitted by the terminal from a base station, determining the transmission timing of the signal using a random hash function and a terminal-specific offset based on the configuration information, the terminal-specific offset being configured by signaling of a higher layer, and transmitting the signal at the determined transmission timing.

18. The terminal of claim 17, wherein the determining of the transmission timing comprises the controller configured to control determining transmission positions of the terminal randomly within a predetermined duration allowed for transmitting the signal.

19. The terminal of claim 17, wherein the determining of the transmission timing comprises the controller configured to control determining transmission positions of the terminal randomly using the random hash function having receiving an input of at least one of an index of subframe for periodic transmission, cell identifier, and terminal identifier.

20. A base station for controlling signal transmission timing of a terminal in a wireless communication system, the base station comprising:
a transceiver configured to transmit and receive signals to and from a terminal; and
a controller configured to control generating configuration information for randomizing transmission timing of the signal transmitted from the terminal to the base station, transmitting the configuration information to the terminal, and receiving the signal transmitted by the terminal at the transmission timing,
wherein the transmission timing of the signal is determined by the terminal using a random hash function and a terminal-specific offset based on the configuration information, the terminal-specific offset being configured by signaling of a higher layer.

* * * * *